United States Patent [19] [11] Patent Number: 4,637,279
Itoh et al. [45] Date of Patent: Jan. 20, 1987

[54] METHOD FOR CONTROLLING A CONTINUOUSLY VARIABLE TRANSMISSION

[75] Inventors: Hiroshi Itoh; Mitsuru Takada, both of Toyota, Japan

[73] Assignee: Toyota Jidosha Kabushiki Kaisha, Japan

[21] Appl. No.: 840,542

[22] Filed: Mar. 17, 1986

Related U.S. Application Data

[63] Continuation of Ser. No. 574,739, Jan. 30, 1984, abandoned.

[30] Foreign Application Priority Data

Feb. 7, 1983 [JP] Japan .................................. 58-17551

[51] Int. Cl.$^4$ ...................... B60K 41/12; B60K 41/18
[52] U.S. Cl. ..................................... 74/866; 364/424.1
[58] Field of Search ................ 74/866, 867; 364/424.1

[56] References Cited

U.S. PATENT DOCUMENTS

| 4,107,776 | 8/1978 | Beale | 74/866 X |
| 4,419,910 | 12/1983 | Miki et al. | 74/867 |
| 4,428,257 | 1/1984 | Meyerle et al. | 74/866 |
| 4,458,318 | 7/1984 | Smit et al. | 74/866 X |
| 4,459,878 | 7/1984 | Frank | 74/866 X |
| 4,459,879 | 7/1984 | Miki et al. | 74/866 X |
| 4,462,275 | 7/1984 | Mohl et al. | 74/866 |
| 4,462,277 | 7/1984 | Miki et al. | 74/867 |
| 4,463,629 | 8/1984 | Himmelstein | 74/866 X |
| 4,466,521 | 8/1984 | Hattori et al. | 74/866 X |
| 4,470,117 | 9/1984 | Miki et al. | 74/866 X |

FOREIGN PATENT DOCUMENTS

| 0063786 | 3/1982 | European Pat. Off. |
| 0061735 | 10/1982 | European Pat. Off. |
| 0073475 | 3/1983 | European Pat. Off. |
| 2058257 | 4/1981 | United Kingdom |
| 2076484 | 12/1981 | United Kingdom |

Primary Examiner—Leslie A. Braun
Assistant Examiner—Dirk Wright
Attorney, Agent, or Firm—Parkhurst & Oliff

[57] ABSTRACT

A method for controlling a continuously variable transmission installed in a vehicle. The method controls the continuously variable transmission such that the desired engine speed or the desired transmitting speed ratio of the transmission may be determined to be a function of a throttle opening or a pressure within an intake pipe and a vehicle speed.

15 Claims, 4 Drawing Figures

4,637,279

METHOD FOR CONTROLLING A CONTINUOUSLY VARIABLE TRANSMISSION

This is a continuation of application Ser. No. 574,739 filed Jan. 30, 1984 now abandoned.

BACKGROUND OF THE INVENTION

The present invention relates to a method for controlling a continuously variable transmission, and particularly to a method of controlling a desired engine speed of an engine equipped with a continuously variable transmission.

In a vehicle equipped with a continuously variable transmission, it is proposed a continuously variable transmission such that a desired engine speed at a steady state is determined to be a function of a throttle opening in order to obtain a minimum fuel consumption at a steady state. A horsepower of an engine is determined to be a function of a throttle opening. In such an engine equipped with the continuously variable transmission, the engine speed varies in a large scale when the throttle opening varies a little at a low vehicle speed. For example, when the throttle opening varies by the amount of few percentages, the engine speed happens to cause the variation of the engine speed up to 1000 r.p.m. Such a wide variation of the engine speed impairs the drivability. As the desired engine speed is designed to obtain the minimum fuel consumption regardless of the vehicle speed, the vehicle speed does not promptly increase even when an accelerator pedal is moved up to a big stroke at a high vehicle speed. In this condition, the vehicle speed slowly increases in order to obtain the minimum fuel consumption. This results in the bad drivability.

SUMMARY OF THE INVENTION

The present invention was made in view of the foregoing background and to overcome the foregoing drawbacks. It is an object of this invention to provide a method for controlling a continuously variable transmission which improves the drivability of a vehicle.

To attain the above object, a method for controlling a continuously variable transmission according to the present invention for motor vehicles having a driving pulley with a fixed member and a movable member, the movable member being actuated by a hydraulic cylinder to form a V-shaped opening therebetween, a driven pulley with another fixed member and another movable member, the movable member being similarly actuated by another hydraulic cylinder to form another V-shaped opening therebetween, and a flexible belt member spanning said pulleys, characterized in that a desired engine speed or a speed ratio of that of the driven pulley to the rotating speed of the driving pulley is determined to be a function of a throttle opening and a vehicle speed.

The above object, features and advantages of the present invention will become more apparent from the following description of the preferred embodiment taken in conjunction with the accompanying drawings.

DETAILED DESCRIPTION OF THE PREFERRED EMBODIMENT

The present invention is described in detail with reference to the accompanying drawings which illustrate an embodiment of the present invention.

Figure 1:
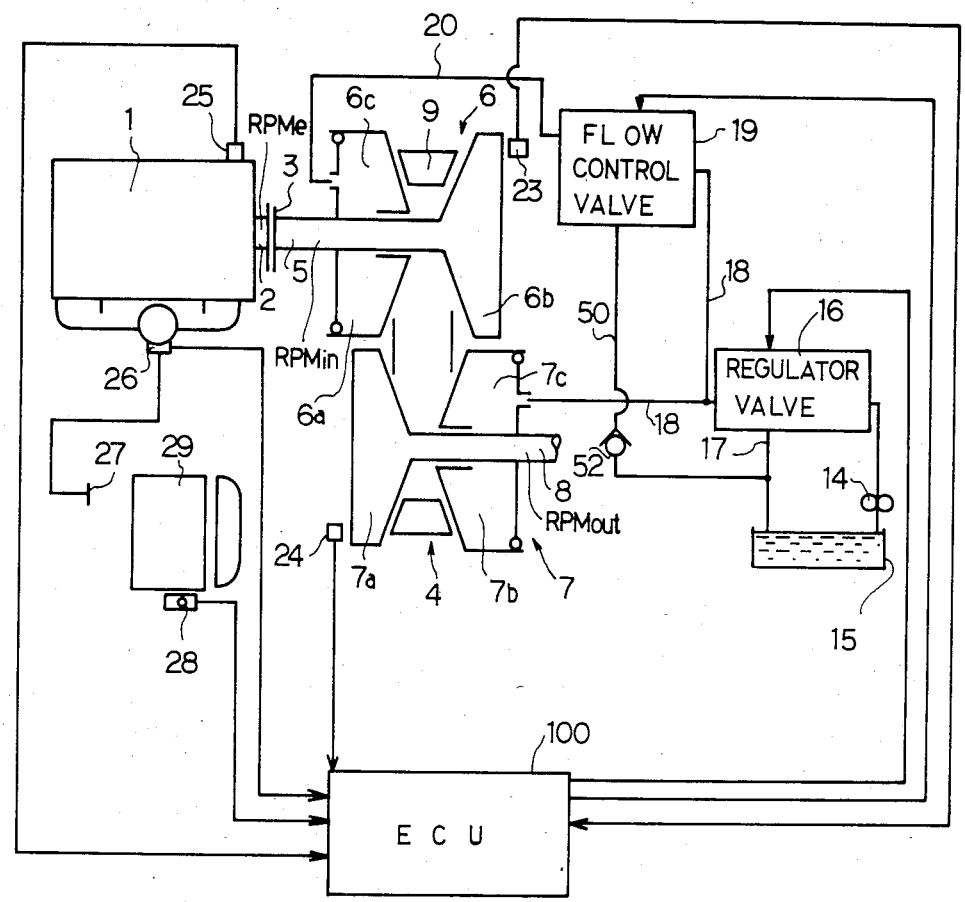
FIG. 1 is a schematic view of a vehicle in which a method according to the present invention is employed.

FIG. 1 shows a schematic view of a vehicle in which a method for controlling a continuously variable transmission according to the present invention is employed. An engine 1 is connected through a crank shaft 2 and a clutch 3 with a shaft 5. The shaft 5 is an input shaft connected with a continuously variable transmission (hereinafter referred to as CVT) 4. The CVT 4 has a couple of pulleys 6 and 7. The pulley 6 is a driving pulley mounted on the driving and input shaft 5 to be driven by the engine 1. The another pulley 7 is a driven pulley mounted on a driven and output shaft 8. The torque of the shaft 8 is transmitted to wheels (not shown in drawings). A torque transmitting V-belt 9 extends between the pulleys 6 and 7. The driving pulley 6 has a member 6a, which axially moves on and rotates with the input shaft 5, and a member 6b, which is fixed to and rotates with the input shaft 5. The member 6a axially moves by the pressure of a hydraulic cylinder 6c. When the member 6a axially moves in the direction to approach to the opposite member 6b, the width defined between the members 6a and 6b can be narrowed. This results in the increase in the effecting diameter of the pulley 6a and 6b. As a result, the speed ratio "e", i.e., (the rotating speed $RPM_{out}$ of the driven pulley 7a and 7b)/(the rotating speed $RPM_{in}$ of the driving pulley 6a and 6b) is increased. The speed $RPM_{in}$ of the driving pulley is equal to the engine speed, $RPM_e$. Similarly, the driven pulley 7 has a member 7b, which axially moves on and rotates with the output shaft 8, and a member 7a, which is fixed to and rotates with the output shaft 8. The member 7b axially moves by the pressure of a hydraulic cylinder 7c. When the member 7b axially moves in the direction to approach to the opposite member 7a, the width defined between the members 7a and 7b can be narrowed, thereby it increases the effective diameter of the pulley 7a and 7b. In order to minimize a power loss consumed by an oil pump 14, the hydraulic pressure of the cylinder 7c is controlled to be as small as possible while keeping the slip-free torque transfer between the driven pulley 7a, 7b and the belt 9. The hydraulic pressure of the cylinder 6c is controlled in order to vary the speed ratios. The value of the pressure of the cylinder 6c is designed to be smaller than that of the pressure of the cylinder 7c. However, as the total square applied with the hydraulic pressure of the cylinder 6c is designed to be larger than that of the cylinder 7c, it is possible to obtain the speed ratio more than or equal to one. The CVT 4 is supplied with the fluid in the following procedure:

The oil pump 14 driven by a motor supplies the oil in a reservoir 15 to a regulator valve 16. The regulator valve 16 controls the pressure supplied to the oil passage 18 by adjusting the amount of the drained oil, thereby the regulator valve 16 generates a line pressure in the oil passage 18. The regulator valve 16 supplies the line pressure through the oil passage 18 to the cylinder 7c of the driven pulley 7 and to a flow control valve 19. The flow control valve 19 is a three port connection valve, and includes an inlet port communicated with the passage 18, a drain port communicated with a drain passage 50 and an outlet port communicated through an oil passage 20 with the cylinder 6c of the driving pulley 6. When the valve 19 is in the first position, the inlet port communicates with the outlet port. Next, when the valve 19 is in the second condition, there is no communication among three ports. Finally, when the valve 19 is in the third position, the outlet port communicates with the drain port. A check valve 52 is provided on the drain passage 50. The check valve 52 allows the oil flow only from the valve 19 to the oil reservoir 15. A sensor 23 detects the rotating speed $RPM_{in}$ of the driving pulley 6. A sensor 24 detects the rotating speed $RPM_{out}$ of the driven pulley 7. A sensor 25 is an engine coolant temperature sensor for detecting a temperature of an engine coolant in the engine 1. A sensor 26 detects a throttle opening of a throttle valve, which is actuated by a stroke of an accelerator pedal 27 installed adjacent to a driver's seat 29. A sensor 28 detects a shift position of a transmission installed in a vehicle. In case of an automatic transmission, the sensor 28 detects the shift range of the transmission.

When the hydraulic pressure of the cylinder 7c of the movable member 7b of the driven pulley 7 increases, the member 7b is forced to approach to the opposite member 7a. Due to this, the contact points between the pulley 7 and the belt 9 moves to the points which are positioned in the outer portions of the driven pulley 7. The value of the line pressure is controlled so that it may not cause the slip between the belt 9 and the pulley 7. When the hydraulic pressure of the cylinder 6c of the driving pulley 6 increases, the movable member 6a of the driving pulley 6 is forced to approach to the opposite member 6b. Due to this, the contact points between the driving pulley 6 and the belt 9 moves to the point which are positioned in the outer portions of the driving pulley 6. Thus, the speed ratio of the CVT 4 is controlled.

Figure 2:
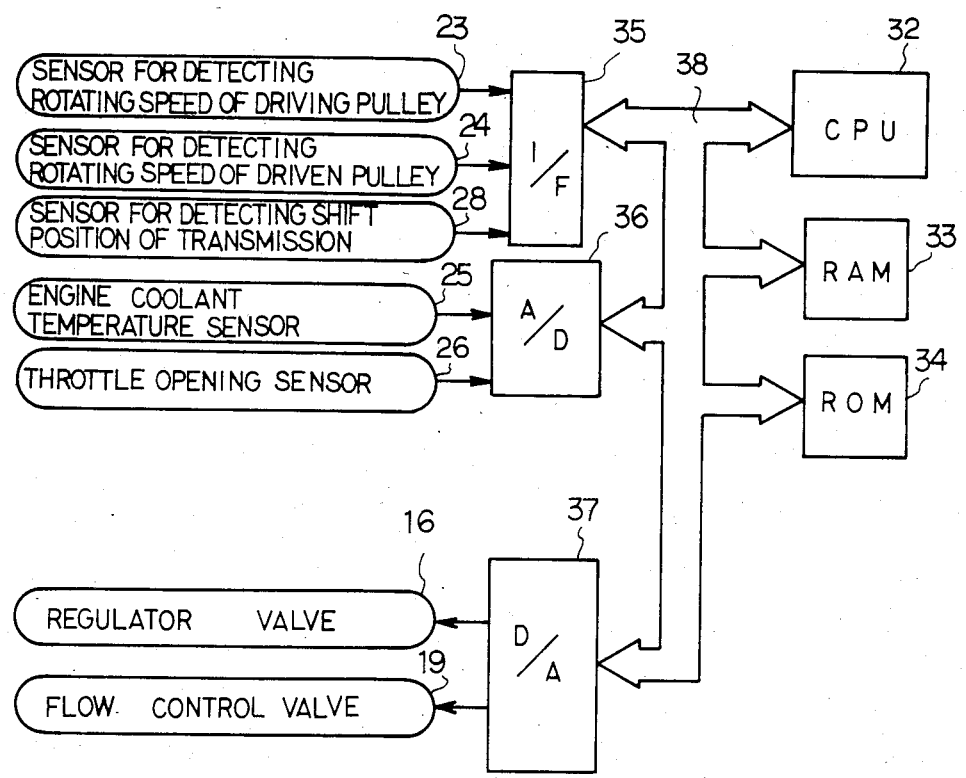
FIG. 2 is a block diagram of an electronic control apparatus employed in the continuously variable transmission.

An electronic control unit (hereinafter referred to as ECU) 100 controls the regulator valve 16 and the flow control valve 19 by the signals detected by the sensors. FIG. 2 shows that the ECU 100 functions as a digital computer, and has a central processing unit (hereinafter referred to as CPU) 32 which carries out the arithmetic and logic processing means, an inter-face (hereinafter referred to as I/F) 35, an analog-digital converter (hereinafter referred to as A/D) 36, a random-access memory (hereinafter referred to as RAM) 33 which temporarily stores the calculated data of the CPU 32, a read-only memory (hereinafter referred to as ROM) 34 which stores a predetermined control program and arithmetic constants therein, and a digital-analog converter (hereinafter referred to as D/A) 37. They are connected by a common bus 38. For example, the I/F 35 receives the output signals of the sensor 23 for detecting the rotating speed $RPM_{in}$ of the driving pulley 6, the sensor 24 for detecting the rotating speed $RPM_{out}$ of the driven pulley 7, and the sensor 28 for detecting the shift position of the transmission. The A/D 36 receives the output signals of the engine coolant temperature sensor 25 and the throttle opening sensor 26. The CPU 32, a microprocessor, then compares the received information against any stored information, and issues an output to the D/A 37 which then subsequently output the appropriate instructions to the regulator valve 16 and the flow control valve 19.

Figure 3:
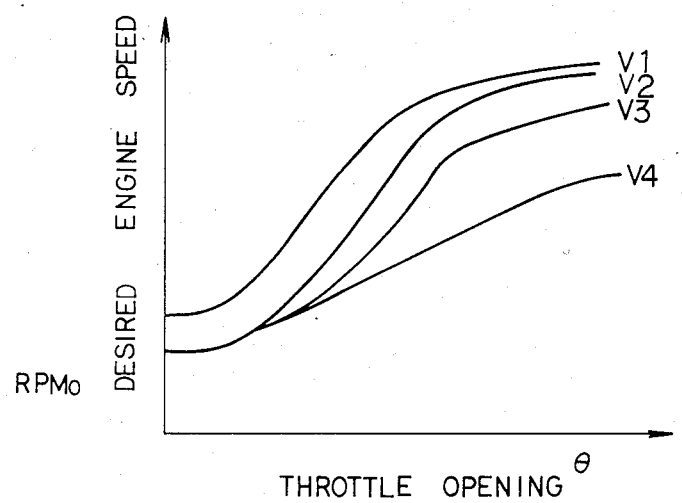
FIG. 3 is a graph showing the relation between a throttle opening and a desired engine speed.

FIG. 3 shows the relation between the throttle opening $\theta$ and the desired engine speed $RPM_o$. The references, V1, V2, V3 and V4 indicate the vehicle speeds, and they are designed to satisfy the following relation:

$$V1 > V2 > V3 > V4$$

For example, V1, V2, V3, and V4 are selected to have the internal 20 Km/h. The desired engine speed $RPM_o$ at a high vehicle speed is decided to have a larger value than that at a low vehicle speed.

Figure 4:
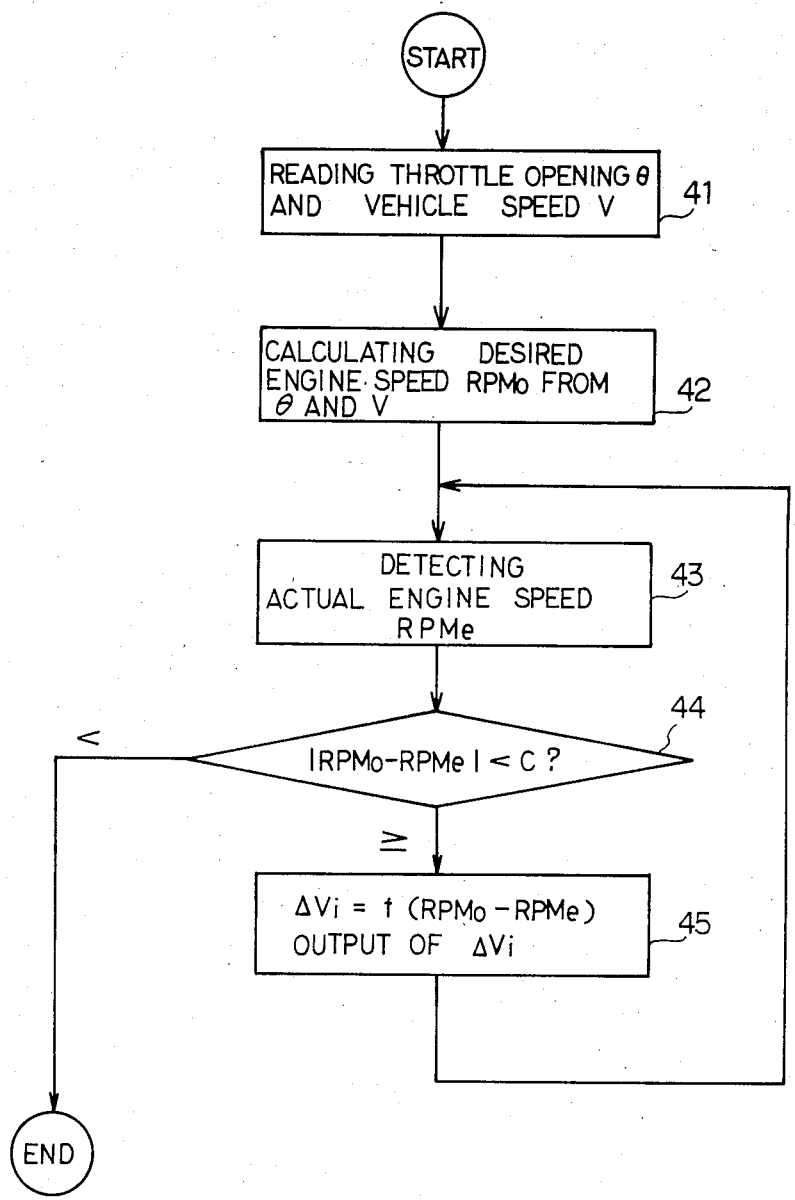
FIG. 4 is a flow chart of an electronic operation employed in the continuously variable transmission.

FIG. 4 shows a flow chart of an electronic operation employed in the continuously variable transmission. The desired engine speed $RPM_o$ is calculated from the detected throttle opening $\theta$ and vehicle speed V. The actual engine speed $RPM_e$ (= the rotating speed $RPM_{in}$ of the CVT 4) is controlled to become the desired engine speed $RPM_o$ by the use of the feedback control.

In a step 41, the throttle opening $\theta$ and the vehicle speed V are read. The program proceeds to a step 42. In the step 42, the desired engine speed $RPM_o$ is calculated from the map which defines the desired engine speed, shown in FIG. 3. If the ROM 34 has the small capacity, the typical vehicle speeds are memorized in the ROM 34. In this condition, when the detected vehicle speed V is different from the data stored in the ROM 34, the desired engine speed $RPM_o$ is determined by the following procedure. For example, if the detected vehicle speed V is in the scope between the stored vehicle speeds V1 and V2, the desired engine speed at the detected vehicle speed V would be in proportion to the range between the desired engine speeds at the vehicle speeds V1 and V2. The program proceeds to a step 43. In the step 43, the actual engine speed $RPM_e$ is detected from the output signal of the sensor 23. The program proceeds to a step 44. In the step 44, it is calculated whether $|RPM_o - RPM_e|$ is less than C (constants). If $|RPM_o - RPM_e|$ is less than C, the program ends. Conversely, $|RPM_o - RPM_e|$ is equal to or more than C, the program proceeds to a step 45. In the step 45, the amount $\Delta Vi$ of the change of the input voltage Vi is a function of $(RPM_o - RPM_e)$ and is calculated. The step 45 outputs the following $\Delta Vi$:

$$\Delta Vi = f(RPM_o - RPM_e)$$

If the actual engine speed $RPM_e$ is less than the desired engine speed $RPM_o$, the fluid is drained through the flow control valve 19 from the cylinder 6c. Due to this, the speed ratio e of the CVT 4 is urged to decrease. This results in the increase in the engine speed $RPM_e$. If the actual engine speed $RPM_e$ is larger than the desired engine speed $RPM_o$, the fluid is supplied through the flow control valve 19 to the cylinder 6c. Due to this, the transmitting speed ratio e of the CVT 4 is urged to increase. This results in the decrease of the actual engine speed $RPM_e$. The output signal of the step 45 returns to the step 43. In the steps 43 through 45, the actual engine speed $RPM_e$ is controlled to have the nearly equal value to the desired engine speed $RPM_o$.

In lieu of a throttle opening, a pressure within an intake pipe for suctioning an air from the outside may be employed. The pressure within the intake pipe is in proportion to the throttle opening. In a continuously variable transmission in which the pressure within the intake pipe is employed instead of a throttle opening, the desired engine speed is determined to be function of the pressure within the intake pipe and the vehicle speed.

According to the present embodiment, the engine speed is selected as a controlled variable. The present invention may be applied to the CVT 4 in which a transmitting speed ratio is adopted as a controlled variable. In this case, the desired transmitting speed ratio $e_o$ is defined as the ratio $RPM_{out}/RPM_o$. The actual transmitting speed ratio e is calculated from the ratio $RPM_{out}/RPM_{in}$.

While the present invention has been described in its preferred embodiment, it is to be understood that the invention is not limited thereto, and may be otherwise embodied within the scope of the following claims.

What is claimed is:

1. A method for controlling a continuously variable transmission for motor vehicles, having an input shaft for connecting an engine to a continuously variable transmission, a driving pulley mounted on the input shaft, said driving pulley including a non-movable member and a movable member, the movable member being actuated by an hydraulic cylinder to form a V-shaped opening between the non-movable and the movable member, an output shaft, a driven pulley mounted on the output shaft, said driven pulley including another non-movable member and another movable member, the another movable member being similarly actuated by another hydraulic cylinder to form another V-shaped opening between said another non-movable member and said another movable member, a flexible belt member spanning said pulleys, and a memory means; comprising the steps of:
   storing data representative of a plurality of discrete relationships between openings of a throttle valve and optimum numbers of revolutions per minute of said input shaft in said memory means, each of said plurality of relationships corresponding to an actual vehicle speed;
   detecting an actual opening of said throttle valve which is proportional to an amount of fuel injected into an engine;
   detecting an actual number of revolutions per minute of said input shaft;
   detecting an actual vehicle speed;
   determining an optimum number of revolutions per minute of said input shaft from said plurality of discrete relationships stored in said memory, whereby for each said actual vehicle speed detected, one of said plurality of discrete relationships is chosen, and for said actual throttle opening detected, an optimum number of revolutions per minute is selected;
   comparing the detected actual number of revolutions per minute of said input shaft with said selected optimum number of revolutions per minute of said input shaft; and
   controlling an amount of hydraulic fluid injected into the hydraulic cylinders, in accordance with the comparison between said actual and desired number of revolutions per minute of said input shaft, to achieve said optimum rotation speed.

2. The method of claim 1, wherein the detecting of said actual opening of said throttle valve is performed by a throttle opening sensor.

3. The method of claim 1, wherein the detecting of said actual opening of said throttle valve is performed by a pressure sensor within an intake pipe of the engine.

4. The method of claim 1, wherein the actual number of revolutions per minute of said input shaft corresponds to the rotational speed of an engine.

5. The method of claim 1, wherein the optimum number of revolutions per minute of said input shaft corresponds to the rotational speed of the driving pulley.

6. The method of claim 4, wherein the actual number of revolutions per minute of the input shaft increases when the vehicle speed increases.

7. A method for controlling a continuously variable transmission for motor vehicles, having an input shaft for connecting an engine to a continuously variable transmission, a driving pulley mounted on the input shaft, said driving pulley including a non-movable member and a movable member, the movable member being actuated by an hydraulic cylinder to form a V-shaped opening between the non-movable member and the movable member, an output shaft, a driven pulley mounted on the output shaft, said driven pulley including another non-movable member and another movable member, the movable member being similarly actuated by another hydraulic cylinder to form another V-shaped opening between said another non-movable member and said another movable member, a flexible belt member spanning said pulleys, and a memory means; comprising the steps of:
   storing data representative of a plurality of discrete relationships between openings of a throttle valve and optimum numbers of revolutions per minute of said input shaft in said memory means, each of said plurality of relationships corresponding to an actual vehicle speed;
   detecting an actual opening of said throttle valve which is proportional to an amount of fuel injected into an engine;
   detecting an actual number of revolutions per minute of said input shaft;
   detecting an actual vehicle speed;
   determining an optimum number of revolutions per minute of said input shaft from said plurality of discrete relationships stored in said memory, whereby for each said actual vehicle speed detected, one of said plurality of discrete relationships is chosen, and for said actual throttle opening detected, an optimum number of revolutions per minute is selected;
   comparing an absolute value of the difference between the detected actual number of revolutions per minute of the input shaft and the selected optimum number of revolutions per minute of the input shaft with a set of constraints; and
   communicating the hydraulic cylinder of the driving pulley with a drain passage, and draining hydraulic fluid therefrom, when said optimum number of revolutions per minute is larger than said actual number of revolutions per minute, or communicating the hydraulic cylinder of the driving pulley with an hydraulic fluid supply passage for a flow control means, and supplying hydraulic fluid thereto, when said actual number of revolutions per minute is greater than said optimum number of revolutions per minute, in accordance with the result of the comparison between the absolute value of the difference between the optimum number of revolutions per minute of the input shaft and the actual number of revolutions per minute of the input shaft, whereby said input shaft achieves said optimum number of revolutions per minute.

8. The method of claim 7, wherein the detecting of said actual opening of said throttle valve is performed by a throttle opening sensor.

9. The method of claim 7, wherein the detecting of an actual opening of said throttle valve is performed by a pressure sensor within an intake pipe of the engine.

10. The method of claim 7, wherein the actual number of revolutions per minute of said input shaft increases when the vehicle speed increases.

11. A method for controlling a continuously variable transmission for motor vehicles, having an input shaft for connecting an engine to a continuously variable transmission, a driving pulley mounted on the input shaft, said driving pulley including a non-movable member and a movable member, the movable member being actuated by an hydraulic cylinder to form a V-shaped opening between the non-movable member and the movable member, an output shaft, a driven pulley mounted on the output shaft, said driven pulley including another non-movable member and another movable member, the movable member being similarly actuated by another hydraulic cylinder to form another V-shaped opening between said another non-movable member and said another movable member, a flexible belt member spanning said pulleys, and a memory means; comprising the steps of:

storing data representative of a plurality of discrete relationships between openings of a throttle valve and optimum numbers of revolutions per minute of said input shaft in said memory means, each of said plurality of relationships corresponding to an actual vehicle speed;

detecting an actual opening of said throttle valve which is proportional to an amount of fuel injected into an engine;

detecting an actual number of revolutions per minute of said input shaft;

detecting an actual vehicle speed;

determining an optimum number of revolutions per minute of said input shaft from said plurality of discrete relationships stored in said memory, whereby for each said actual vehicle speed detected, one of said plurality of discrete relationships is chosen, and for said actual throttle opening detected, an optimum number of revolutions per minute is selected;

calculating a desired optimum speed ratio from the optimum number of revolutions per minute of the input shaft;

detecting an actual speed ratio;

comparing an absolute value of the difference between the optimum speed ratio and the actual speed ratio with a set of constraints; and communicating the hydraulic cylinder of the driving pulley with an hydraulic fluid supply passage of a flow control means, and supplying hydraulic fluid thereto, when the optimum speed ratio is larger than the actual speed ratio, or communicating the hydraulic cylinder of the driving pulley with a drain passage, and drawing fluid therefrom, when the actual speed ratio is larger than the optimum speed ratio, in accordance with the result of the comparison between the absolute value of the difference between the desired speed ratio and the actual speed ratio whereby the input shaft achieves an optimum number of revolutions per minute.

12. The method of claim 11, wherein the detecting of said actual opening of said throttle valve is performed by a throttle opening sensor.

13. The method of claim 11, wherein the detecting of said actual opening of said throttle valve is performed by a pressure engine sensor within an intake pipe of the engine.

14. A method for controlling a continuously variable transmission for motor vehicles, having an input shaft for connecting an engine to a continuously variable transmission, a driving pulley mounted on the input shaft, said driving pulley including a non-movable member and a movable member, the movable member being actuated by an hydraulic cylinder to form a V-shaped opening between the non-movable member and the movable member, an output shaft, a driven pulley mounted on the output shaft, said driven pulley including another non-movable member and another movable member, the movable member being similarly actuated by another hydraulic cylinder to form another V-shaped opening between said another non-movable member and said another movable member, a flexible belt member spanning said pulleys, and a memory means; comprising the steps of:

storing data representative of a plurality of discrete relationships between openings of a throttle valve and optimum numbers of revolutions per minute of said input shaft in said memory means, each of said plurality of relationships corresponding to an actual vehicle speed;

detecting an actual opening of said throttle valve or pressure within an intake pipe;

detecting an actual vehicle speed;

determining an optimum number of revolutions per minute of said input shaft from said plurality of discrete relationships stored in said memory, whereby for each said actual vehicle speed detected, one of said plurality of discrete relationships is chosen, and for said actual throttle opening or said actual pressure detected, an actual number of revolutions per minute is selected;

comparing an absolute value of the difference between the actual number of revolutions per minute of the input shaft and the optimum number of revolutions per minute of the input shaft with a set of constraints; and communicating the hydraulic cylinder of the driving pulley with a drain passage, and draining hydraulic fluid therefrom, when the optimum number of revolutions per minute of the input shaft is larger than said actual number of revolutions per minute of the input shaft, or communicating the hydraulic cylinder of the driving pulley with an hydraulic fluid supply passage for a flow control means, and supplying hydraulic fluid thereto, when the actual number of revolutions per minute is greater than the optimum number of revolutions per minute, in accordance with the result of the comparison between the absolute value of the difference between the optimum and actual number of revolutions of the output shaft, whereby the output shaft achieves the optimum number of revolutions per minute.

15. A method for controlling a continuously variable transmission for motor vehicles, having an input shaft for connecting an engine to a continuously variable transmission, a driving pulley mounted on the input shaft, said driving pulley including a non-movable member and a movable member, the movable member being actuated by an hydraulic cylinder to form a V-shaped opening between the non-movable member and the movable member, an output shaft, a driven pulley mounted on the output shaft, said driven pulley including another non-movable member and another movable member, the another movable member being similarly actuated by another hydraulic cylinder to form another V-shaped opening between said another non-movable member and said another movable member, a flexible belt member spanning said pulleys, and a memory means; comprising the steps of:

storing data representative of a plurality of discrete relationships between openings of a throttle valve and optimum numbers of revolutions per minute of said input shaft in said memory means, each of said plurality of relationships corresponding to an actual vehicle speed;

determining an optimum number of revolutions per minute of said input shaft from said plurality of discrete relationships stored in said memory, whereby for each said actual vehicle speed detected, one of said plurality of discrete relationships is chosen, and for said actual throttle opening or said actual pressure detected, an actual number of revolutions per minute is selected;

calculating the optimum speed ratio from the optimum number of revolutions per minute of the input shaft;

detecting an actual speed ratio;

comparing an absolute value of the difference between the optimum speed ratio and the actual speed ratio with a set of constraints; and communicating the hydraulic cylinder of the driving pulley with an hydraulic fluid supply passage of a flow control means, and supplying hydraulic fluid thereto, when the optimum speed ratio is larger than the actual speed ratio, or communicating the hydraulic cylinder of the driving pulley with a drain passage, and draining hydraulic fluid therefrom when the actual speed ratio is larger than the optimum speed ratio in accordance with the result of the comparison between the absolute value of the difference between the optimum speed ratio and the actual speed ratio.

* * * * *